United States Patent Office 3,347,467
Patented Oct. 17, 1967

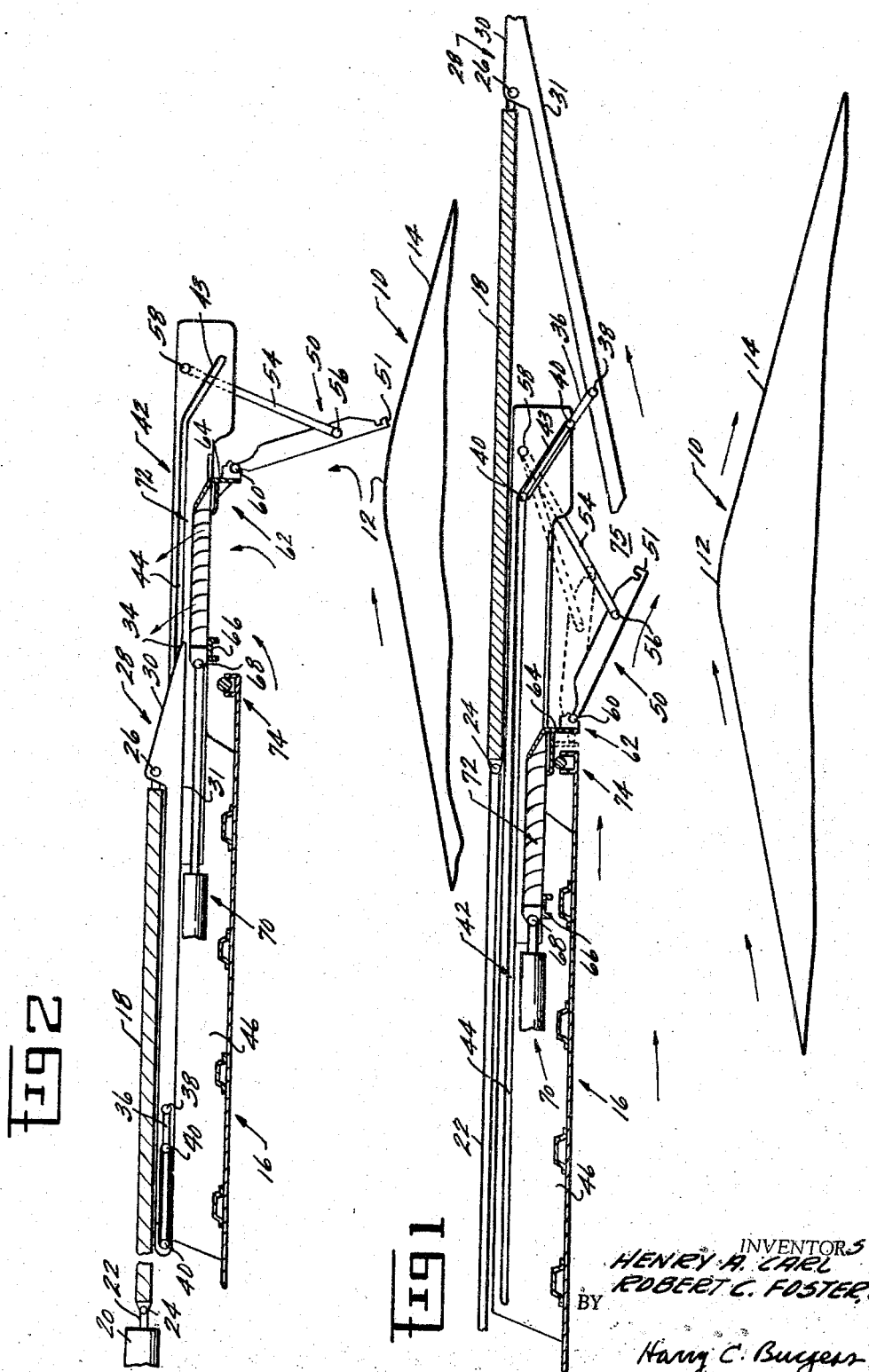

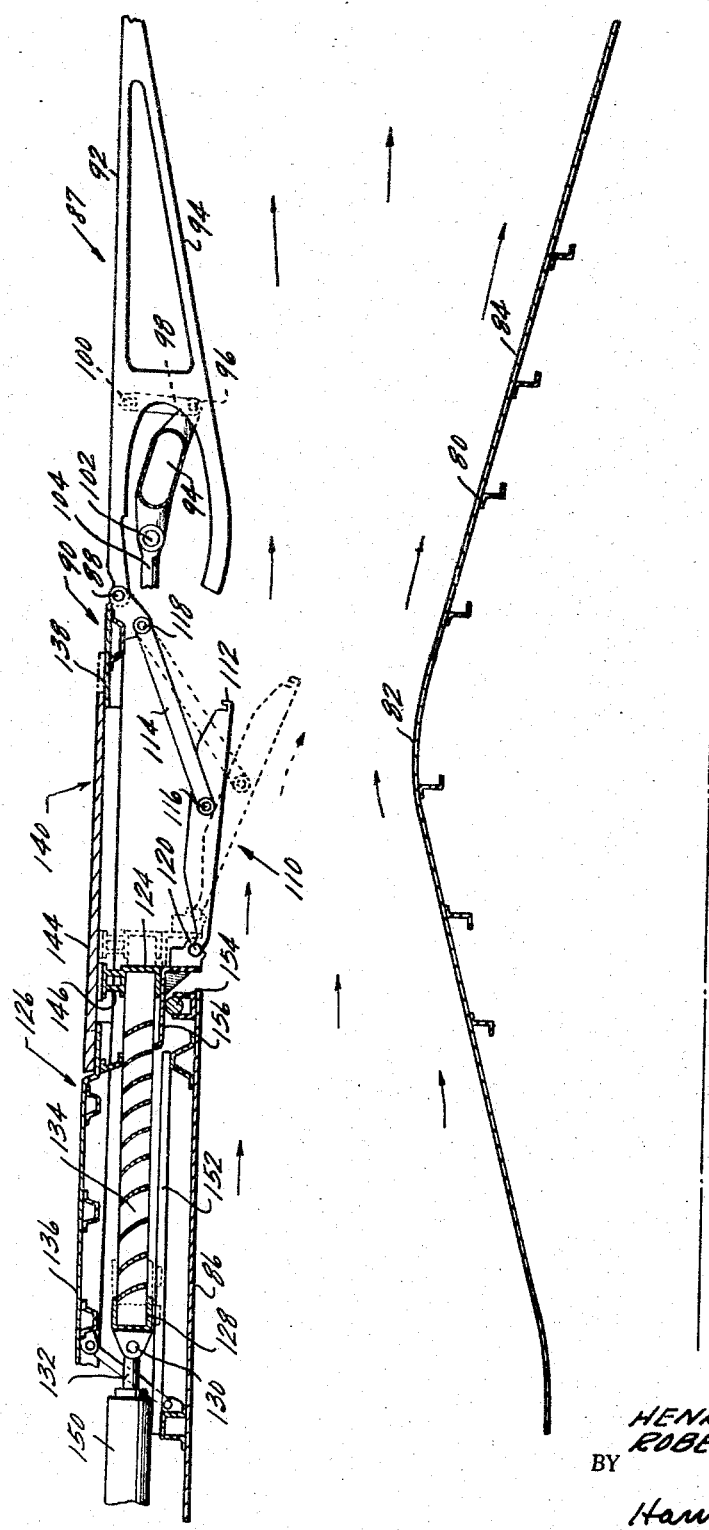

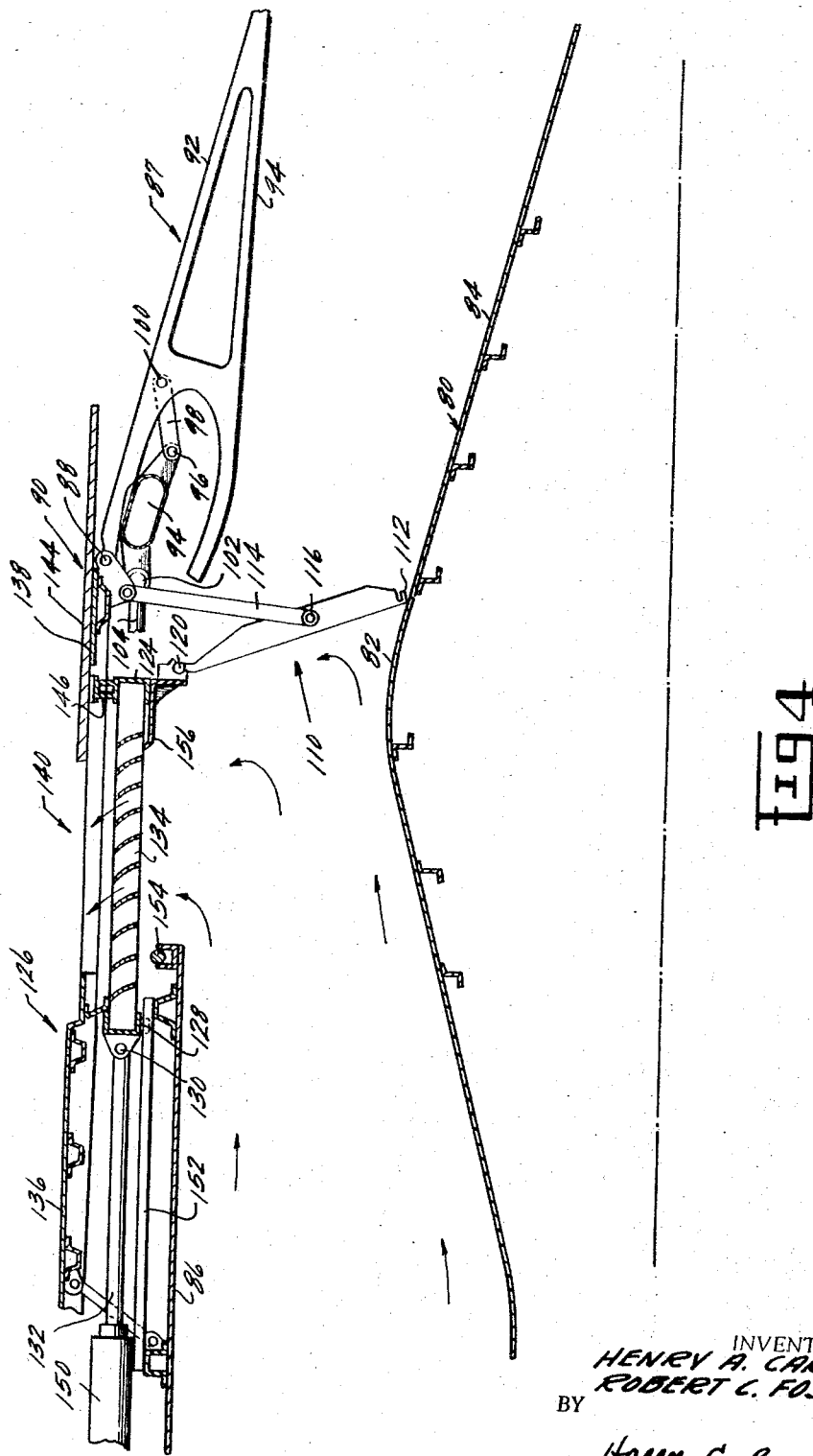

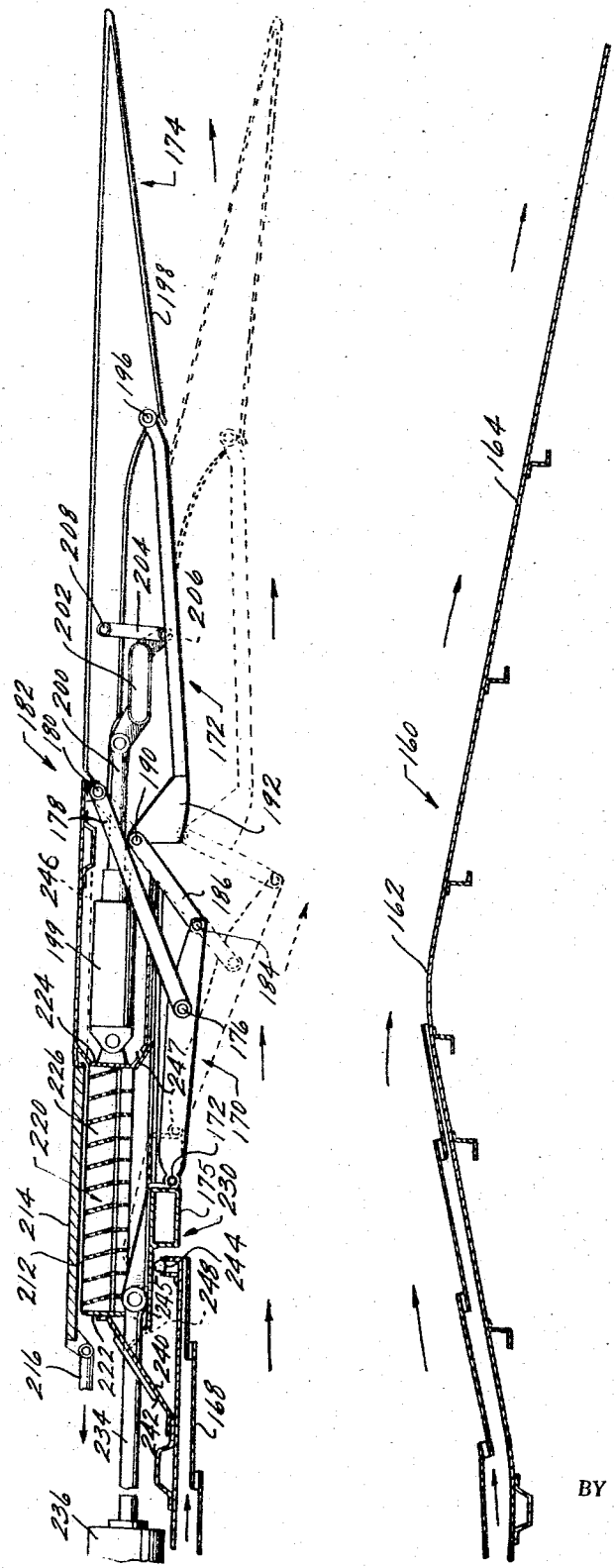

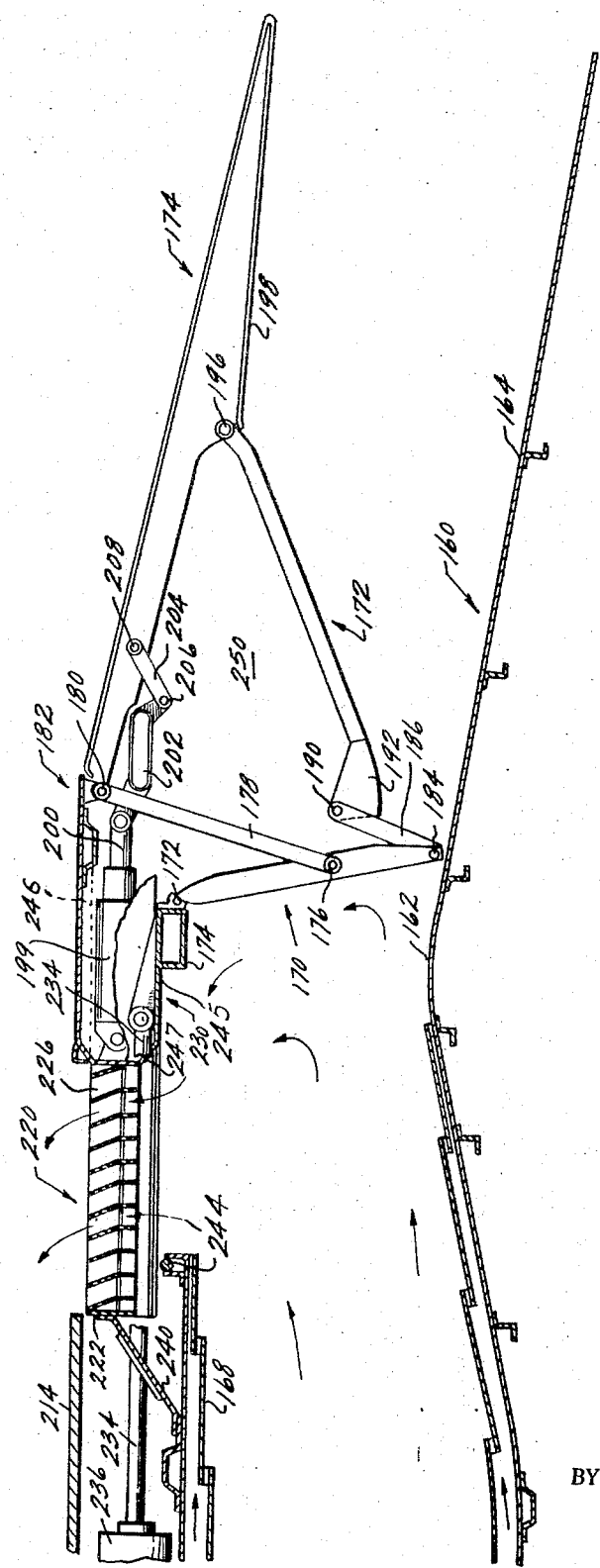

3,347,467
COMBINATION JET EXHAUST NOZZLE
AND THRUST REVERSER
Henry Anton Carl, Cincinnati, Ohio, and Robert Cooper Foster, Jr., Kalamazoo, Mich., assignors to General Electric Company, a corporation of New York
Continuation of application Ser. No. 300,534, Aug. 7, 1963. This application Dec. 5, 1966, Ser. No. 599,319
5 Claims. (Cl. 239—265.31)

This application is a continuation of application Ser. No. 300,534, now abandoned.

The present invention relates generally to a combination exhaust nozzle and thrust reverser and, more particularly, to a combination variable area annular convergent-divergent exhaust nozzle and thrust reverser of simplified and lightweight construction for use in high speed aircraft wherein identical parts are utilized for a dual function, namely, nozzle area variation and thrust reversal.

The exhaust nozzle of a reaction engine, such as a turbojet or turbofan engine, has as its purpose the transformation of the pressure and thermal energy of the combustion discharge or exhaust gases into velocity, the forward thrust of the engine being directly proportional to the increase in velocity of the gas from the entrance of the engine to the exit plane of the nozzle. It is important, particularly in high Mach aircraft, that the maximum velocity be obtained. Increase in velocity can be obtained by passing the gas through a converging nozzle where sonic velocity is obtained. However, to increase the velocity beyond sonic, the nozzle area downstream of the sonic velocity plane must increase. Thus, a nozzle that first converges and then diverges to the proper extent can provide optimum thrust.

In supersonic aircraft where a wide range of nozzle pressure ratios (i.e., the ratio of the pressure upstream of the sonic plane—or throat—to ambient) are likely to be encountered, it may be desirable to arrange to vary both the minimum area, or throat, and the nozzle exit area, or divergent portion. In addition, while it is advantageous to keep the nozzle maximum diameter at a minimum, to avoid aerodynamic drag problems, this may be difficult due to the need for mechanisms to vary the throat and exit areas. A so-called "plug" nozzle wherein a bulbous, generally conical nozzle centerbody tapering in a downstream direction is provided can be used to help define the throat area and the divergent expansion surface for the exhaust gases so as to minimize the extent of the nozzle throat diameter changes. Recently, however, the engine designer's problems have become further complicated by the requirement that high speed commercial transports, in particular, have some means of thrust reversal, i.e., deflecting or turning the exhaust gases from their normal rearward path. Typically, thrust reversal means for jet engines have taken the form of large so-called blocker doors pivotally mounted aft about the engine center line which doors are capable of being moved into the path of the gases. Fairly complicated mechanisms, including links, actuators, tracks, rods, and the like are usually needed to accomplish movement of the exhaust gas flow blockage means. When this is further complicated by the need for similar mechanisms to vary the convergent-divergent nozzle throat and exit areas, it becomes apparent that a combination of functions and simplified parts would be extremely beneficial in terms of engine performance and weight if it would be possible to design an integral thrust reverser and annular variable area convergent-divergent nozzle which would still provide optimum performance under all operating conditions.

Accordingly, it is the general object of our invention to provide a combination annular variable area jet exhaust nozzle and thrust reverser of improved, lightweight and simplified design.

A more specific object of the invention is to provide a lightweight, simplified combination annular variable area convergent-divergent exhaust nozzle and thrust reverser and actuation system therefor for use with a turbojet or turbofan engine in supersonic aircraft.

A further object of the invention is to provide a combination annular variable area convergent-divergent exhaust nozzle and thrust reverser for use with a turbojet or turbofan engine in supersonic aircraft wherein principal parts utilized for nozzle area variation and thrust reversal are one and the same.

Still another object of the invention is to provide an annular variable area jet exhaust nozzle and thrust reverser wherein the combination of the former with the latter does not result in degradation of the ideal aerodynamic configuration, i.e., performance of the exhaust nozzle.

Briefly stated, the invention comprises a combination variable area annular convergent-divergent exhaust nozzle and thrust reversing device for a jet engine having an annular tailpipe, including a plurality of primary flaps at least partially defining a throat area in the nozzle (in one embodiment, for example, in combination with the area of maximum diameter of a "plug" member), the primary flaps forming the convergent portion of the nozzle, and a plurality of secondary flaps downstream of the nozzle throat, the secondary flaps defining the exit area and forming the divergent portion of the nozzle. An annular support member translatable axially of the tailpipe is provided, the member having means for pivotally supporting the upstream end of the primary flaps, there being flow turning means incorporated with the support member and a cover member affixed to the annular member in one embodiment thereof, the cover member being translatable therewith. A single actuator means may be provided for translating the annular support member between a first and a second position to vary the nozzle throat area, during forward thrust operation, and between the second and a third position for thrust reversal, wherein the primary flaps pivot so that the downstream ends thereof move in concert towards the nozzle axis (or to abut the conical member where utilized) thereby substantially blocking the normally rearward flow of the exhaust gases and forcing the exhaust gas flow through side ports in the tailpipe. The cover member blocks the ports during movement between the first and second positions, while uncovering the ports in the third position.

Other objects and many of the attendant advantages of this invention may be more readily appreciated as the same becomes better understood by reference to the following detailed description, when considered in connection with the accompanying drawings wherein:

FIG. 1 is a partial cross-sectional view taken along a line parallel to the engine axis and showing one embodiment of our combined annular convergent-divergent exhaust nozzle and thrust reverser in the forward thrust position wherein the dotted lines indicate variation of the nozzle throat area;

FIG. 2 illustrates the embodiment of FIG. 1 in the thrust reversal position;

FIG. 3 is a view similar to that of FIG. 1 and illustrating still another embodiment of the combined annular variable area convergent-divergent nozzle and thrust reverser of the invention with the nozzle in the forward thrust (supersonic) operating position;

FIG. 4 illustrates the nozzle embodiment of FIG. 3 in the thrust reversal position;

FIG. 5 is a view similar to that of FIGS. 1 and 3 and illustrating still another embodiment of the combined annular variable area convergent-divergent exhaust nozzle and thrust reverser of the invention having improved nozzle throat and exit area variation characteristics and showing the nozzle in the forward thrust position; and FIG. 6 illustrates the embodiment of FIG. 5 in the thrust reversal position.

Turning first to FIGS. 1 and 2, shown is one embodiment of the invention utilized in a center "plug" type nozzle with the variable area portions of the exhaust nozzle shown in the supersonic operating mode in FIG. 1 and in the thrust reversal position in FIG. 2. The portions comprising principally the nozzle include the inner bulbous or generally conical "plug" member indicated at 10 having an area of maximum diameter at 12 and a tapering downstream portion 14. The inner member or plug is supported by means of an axial extension (not shown) mounted centrally of the tailpipe of the engine, indicated generally at 16. The outer portion of the nozzle comprises an axially extendable cylinder or shroud member 18 mounted for translation forward and aft about the engine tailpipe 16 by means of an actuator 20 and an actuator rod 22 pivotally attached at 24 to the shroud. Pivotally mounted at 26 at the downstream end of the shroud is a plurality of secondary flaps or fingers, one of which is indicated generally at 28. The secondary flaps or fingers, which are operable to vary the divergent portion or exit of the annular convergent-divergent nozzle, comprise an outer surface 30 and an inner surface 31. The outer and inner surfaces converge to meet at a downstream edge or lip 34 defining the nozzle exit plane or orifice. At the upstream end of the secondary flap members suitable means are provided to cause pivotal movement of the secondary flaps about the point 26. In the embodiment shown, the means comprise a link member 36 pivotally attached to the secondary flap at 38 at one end thereof, the other end being connected to a pair of rollers 40—40 mounted in a cam slot, indicated generally at 42. Cam slot 42 comprises a downstream angled, slightly curved section 43 and an upstream elongated section 44 extending generally parallel to the engine axis. The cam slot 42 is formed in a bulkhead member 46 which extends in a radial plane with respect to the engine. The bulkhead member 46 is relatively thin in width in the radial plane and, as shown, may extend axially for a significant distance upstream of the flap area to provide additional stiffening of the tailpipe 16.

A primary feature of the annular convergent-divergent variable area nozzle shown is the provision for a variable primary or throat area by means of a plurality of flaps, one of which is indicated generally at 50. The primary flaps provide a significant amount of nozzle throat area variation for optimum performance during subsonic flight speeds, and for supersonic flight speeds also, in combination with the secondary flaps 28. In this embodiment the downstream ends 51 of the primary flaps 50 define the throat area of the nozzle in combination with the area 12 of maximum diameter of plug member 10 and provide variation of the nozzle throat as now described. Each of the primary flaps is partially supported by means of a link member 54 pivotally attached to the flap at 56 and to the bulkhead member at 58. The upstream end of the primary flap 50 is pivotally attached at 60 to an annular member, indicated generally at 62. Member 62 comprises a downstream annular support ring 64, from which the primary flaps are pivotally supported and an upstream annular ring member 66 pivotally attached at 68 to an actuator, indicated generally at 70. It will be understood that the annular member 62 may comprise a cylindrical member extending 360° about the engine axis or in another embodiment may comprise a plurality of arcuate segments equally spaced about the engine axis. The cylindrical or arcuate member or members may also be provided with a plurality of flow turning means or vanes 72 to assist in the exhaust gas thrust reversal now to be described.

It will be apparent that, as shown in FIG. 1, the annular member 62 can be moved between a first position (indicated by the dotted lines), wherein the nozzle is operating in the forward thrust position and the exhaust gases are prevented from flowing into the annular member by seal means, indicated generally at 74, and a second position (indicated by solid lines in FIG. 1), to provide a wide range of forward thrust modulation to achieve the desired velocity of the exhaust gases to maximize performance of the engine.

The primary and secondary flaps, and the shroud, can also assume intermediate positions for intermediate flight speeds, for example, transonic acceleration. Note that leakage of exhaust gases in the forward thrust positions is prevented by seal means, indicated generally at 74. It will be understood that leakage is primarily a problem upstream of the throat where the gas stream static pressure is relatively higher than it is downstream thereof. Further, cooling airflow ejected from the cavity 75 will prevent any tendency of flow back upstream through the gap between the ends of the flaps 50 and 28. To go into the thrust reversal mode, as shown in FIG. 2, it will be seen with the simplified actuation means of the present invention, there is merely required that the actuator means 70 move the annular member 62 from the aforementioned second position to a third position wherein the primary flaps 50 are pivoted about point 60 the downstream ends 51 thereof moving towards the engine axis or into abutment with the inner member 10 while at the same time and with the same movement the turning vanes 72 are positioned so that the exhaust gas flow is deflected laterally of the nozzle. Since the shroud 18 is normally in the retracted position (see FIG. 2) from Mach 0.9 to landing, movement of the shroud is not required to go into reverse thrust.

Referring now to FIG. 3, the dawing illustrates a further embodiment of the invention wherein the annular variable area convergent-divergent nozzle is of another construction. In this embodiment of the invention there is provided an annular plug member 80 having an area of maximum diameter 82 and a tapering downstream portion 84. The plub member is located centrally of the engine exhaust duct or tailpipe, indicated at 86. The nozzle of this embodiment comprises a plurality of secondary flaps or fingers, one of which is indicated generally at 87, pivotally mounted at 88 at the upstream ends thereof to the downstream end of a shroud member, indicated generally at 90. Each secondary flap comprises an outer surface 92 and an inner surface 94 diverging at an angle therefrom in an upstream direction. The secondary flaps are pivoted about point 88 by means of a unison ring 94 adapted to be pivotally connected at 96 to one end of a link 98, the other end of the link being pivotally attached at 100 to the secondary flap. The unison ring 94 is pivotally attached at 102 to an actuator rod, indicated partially at 104, the rod being operably connected to suitable actuator means (not shown) located upstream of the nozzle area and interiorly of the shroud 90. The surface 94 of the secondary flaps and the tapering portion 84 of the nozzle plug comprise the divergent portion of the annular convergent-divergent nozzle, as did surfaces 14 and 31 of the previously described embodiment. In a manner similar to the previous embodiment, a plurality of primary flaps, one of which is indicated generally at 110 are provided. Each primary flap has a downstream end 112 which defines the nozzle throat area in combination with the maximum diameter area 82 of the plug member 80. The primary flap is partially supported by means of a link 114 pivotally attached at one end to the flap at 116, the other end of the link being pivotally supported at 118 adjacent the downstream end of the shroud 90. The upstream ends of the primary flaps are pivotally attached at 120 to ring 124. The ring is part of a cylindrical support member indicated generally at 126. The cylindrical member also includes an upstream ring 128 pivotally attached at 130 to an actuator rod 132. The annular member 126 may also include a plurality of flow turning vanes 134 for use in the thrust reversal mode. As shown, the outer shroud 90 includes an upstream portion 136 and a downstream portion 138. The upstream and downstream portions of the shroud are separated to provide a plurality of ports, one of which is indicated generally at 140. Preventing flow through the ports is a cover member 144 attached to an outer support section 146 of the ring 124. The cover member 144 is adapted to slide on the outer surface of the downstream portion 138 of the shroud 90. As shown in FIG. 3, the nozzle members are in position for forward thrust operation. Variation of the nozzle throat area by pivoting the primary flaps is accomplished by translation of the annular member 126 by means of the actuator 150 along an axially extending track 152 affixed to the outer surface of the exhaust duct or tailpipe 86. Movement between a first position (solid lines in the drawings) and a second position (dotted lines in the drawings) enables nozzle throat area variation over a wide range of flight speeds. It will be noted that movement between the first and second positions does not uncover the annular turning vanes 134 due to the annular sealing means 154 being in contact with an axially-extending cylindrical portion 156 of the supporting ring 124. However, when it is decided to move into thrust reverser operation, as will be seen in FIG. 4, the actuator 150 moves the annular ring member 126 still further aft to a third position until the primary flaps 110 have pivoted so as to abut the plug member 80. In conjunction with movement of the primary flaps and the annular support member 126, the cover member 144 is moved aft so as to uncover ports 140. Thus, the exhaust gas flow is turned laterally of the engine axis and thrust reversal is accomplished. The nozzle configuration shown in the FIGS. 3 and 4 is particularly adapted for low aerodynamic drag due to the angle which the secondary fingers or flaps 86 form with the outer engine shell or nacelle (not shown) to reduce drag. Again, it will be apparent that the invention provides a greatly simplified combined nozzle area variation and thrust reversing mechanism wherein a single actuation means is utilized to vary the nozzle and accomplish thrust reversal.

Turning now to FIGS. 5 and 6 a third embodiment of the subject invention is disclosed wherein the annular convergent-divergent nozzle comprises a plug member 160 having an area of maximum diameter 162 and a tapering downstream portion 164. As in the previous embodiments, the plug member is mounted concentrically in an engine exhaust duct or tailpipe, indicated generally at 168. In this embodiment an improved convergent-divergent variable area nozzle configuration is employed having a first plurality of primary flaps, a second plurality of inner divergent flaps, and a third plurality of outer divergent flaps. One flap of each of the first, second and third pluralities is indicated generally at 170, 172 and 174, respectively. The primary flaps are pivotally supported at their upstream ends 172 by a ring member 175. The primary flaps are also attached approximately midway of their axial length at 176 to one end of a link member 178, the other end of which is pivotally attached at 180 to the downstream end of an outer shroud member indicated generally at 182. The downstream end of the primary flap 170 is pivotally attached at 184 to one end of a link 186, the other end of which is attached at 190 to an extension or clevis portion 192 of the inner divergent flap 172. The other end of the inner divergent flap is pivotally attached to the outer divergent flap 174 approximately midway on the interior surface thereof, as indicated generally at 196. The downstream portion or inner surface 198 of the divergent flap 174 combines with the tapering portion 164 of the plug member to form the divergent portion of the nozzle and define the exit area thereof. The upstream ends of the divergent fingers 174 are also pivotally attached at 180 to the downstream end of the shroud 182. A fixedly mounted actuator 199 is pivotally attached by a rod 200 to a unison ring 202 which, in turn, is pivotally attached to one end of a link 204 at 206. The other end of the link is connected to the divergent flaps 174 at 208 so as to provide for nozzle exit area variation, as hereinafter described.

At the upstream end of the shroud 182 is a recess 212 constructed to receive a cover member 214 adapted to be translated axially of the engine by means of an actuator rod 216 attached to suitable actuation means (not shown). Inward of the cover member 214 is an annular member, indicated generally at 220. The annular member comprises an upstream support ring 222 and a downstream support ring 224. Located between the rings 222 and 224 and forming the fully annular—or segmented member, if desired—are a plurality of flow turning vanes 226. Passing between the flow turning vane segments of the annular member 220 (or located in axial notches in the vanes, wherein the vanes extend 360° about the engine axis) is a clevis indicated at 230 rigidly attached to the ring 175. Pivotally connected to the clevis is an actuator rod 234 attached to an actuator 236. The actuator rod passes through an opening 240 in a conical bulkhead member 242 which supports the ring member 222 of the annular member 220. Sealing means 244 in sliding contact with an upstream cylindrical extension 245 of the ring 175 are provided to prevent leakage in the forward thrust position shown in FIG. 5.

It will be apparent that movement of the actuator rod 234 in turn causes movement of the ring 175 to which the primary flaps 170 are attached at 172. Movement between a first position (as shown in solid lines) and a second position (as shown in dotted lines) will accomplish a wide range of throat area variation in the exhaust nozzle which, as described above, is advantageous. Movement of rod 200 downstream, on the other hand, will cause the divergent fingers 174 and 172 and associated linking members 204 and 186 to move to the dotted line position. Thus, a wide range of throat and nozzle exit area variation is possible without uncovering of the flow turning vanes 226 or leakage past the sealing means 244. If, on landing the aircraft, it is desired to operate the nozzle in the thrust reversing position, the actuator 236 will move the support ring 175 from the second position to a third position still further downstream, wherein the primary flaps 170 pivot so that their downstream ends abut the annular plug member 160 for flow blockage in the rearward direction as shown in FIG. 6. The exhaust flow is therefore forced out laterally and through the flow turning members 226 of the annular supporting member 220.

In the embodiment shown in FIGS. 5 and 6, an additional feature is the fact that with the arrangement described should the secondary actuator 199 fail, the primary or thrust reversal actuator 236 can still operate to vary the nozzle throat area and to move the primary fingers 170 into the reverse thrust position. This additional safety factor is provided with a minimum of additional linkage. Although as shown in FIGS. 5 and 6 a separate actuator rod 216 is utilized to move the cover 214 to uncover the flow turning vanes 226 such movement could also be provided by movement of the actuator rod 234 by means of a suitable connection or link between the cover member and the ring 175 and provision for a recess 246 in shroud 182 similar to the recess located upstream at 212.

Another advantage of the concept of combining the functions of nozzle throat area variation and thrust reverser blockage in the nozzle primary components 50, 110, and 170 of the disclosed embodiments, respectively, is the fact that the primary nozzle flaps are typically designed to withstand an operating environment as severe or more severe than that encountered during reverse thrust operation. Thus, an additional weight saving and reduction in complexity is achieved since reliability and reduced complexity is "built-in" to the thrust reverse flow blocking members. Further, there is no loss or degradation of aerodynamic nozzle performance since the primary nozzle design parameters do not have to be changed to accommodate reverse thrust and the secondary nozzle members or flaps can be separately actuated to provide the area changes required for supersonic flight. It should further be noted that in the arrangement shown in FIGS. 5 and 6 wherein the annular member 220 does not translate with the ring for moving the primary flaps, the reverse thrust forces on the turning vanes will not be transmitted to the nozzle actuation means. This can be beneficial where it is desired to optimize reliability of operation of the nozzle in the forward thrust position. Use of the plug nozzle arrangement reduces required throat area diameter changes which, in turn, greatly simplifies the flap seals. This will reduce considerably the chances of exhaust gas leakage with its associated performance penalty. Also, use of the plug permits reduction in the required length and weight of the secondary nozzle since the plug provides an additional expansion surface for the exhaust gases. It should be noted that in the embodiment shown in FIG. 6 of conical sealing member 247 is adapted to mate with an extension 245 of ring 244 to seal the secondary cavity 250 and prevent leakage of exhaust gas flow in the thrust reversing position. Finally, in all embodiments, the linkage is designed and the gas loadings on the flaps controlled so that in the forward thrust position (i.e., in flight) the nozzle primary and secondary flaps will fail to the "open" position on failure or loss of power of the actuator means. Conversely, in reverse thrust (i.e., on landing) on failure of power e.g., hydraulic or electric, to the thrust reverse actuators, the thrust reverser will also fail to the "open" or operating position.

Other modifications of the lightweight and simplified combination annular convergent-divergent exhaust nozzle and thrust reverser of the invention as would be obvious to those skilled in the art are intended to be within the scope of the appended claims.

Having thus described the invention, what is claimed as novel and desired to be secured by Letters Patent of the United States is:

1. In a gas turbine engine for the propulsion of aircraft,
    a hot gas stream discharge comprising,
    a compositely formed casing defining the outer bounds of the hot gas stream,
    a single set of circumferential flaps disposed generally longitudinally of said casing around the interior thereof, said flaps being pivotally mounted at their upstream ends and forming a variable area, convergent, primary discharge nozzle for the hot gas stream,
    means for imparting limited pivotal movement to said flaps about their upstream ends to optimize the nozzle area for normal flight conditions,
    means for imparting further pivotal movement to said flaps about their upstream ends to bring the nozzle area defined thereby to a minimum value, and
    means for discharging at least a portion of said hot gas stream laterally of said casing as said further pivotal movement is imparted to said flaps whereby thrust reversing action is provided by said engine.

2. A hot gas stream discharge as in claim 1 which further includes,
    a thrust diverter member having flow-turning vanes,
    means for pivotally mounting the upstream ends of said flaps on said member,
    said casing has an opening therethrough,
    means for blocking said opening when limited pivotal movement is imparted to said flaps and
    further wherein,
    the means for imparting further pivotal movement to said flaps includes means for displacing said thrust diverter member in a downstream direction to bring said vanes into register with said opening, and
    the means for discharging at least a portion of said hot gas stream laterally of said casing includes means for removing the blocking means from said opening as said thrust diverter member is moved downstream.

3. A hot gas stream discharge as in claim 2 wherein, the casing comprises an inner liner terminating adjacent the upstream ends of said flaps and
    the thrust diverter member during said limited pivotal movement of the flaps is in a stowed position upstream and outwardly of said inner liner,
    said first diverter member being displaced beyond the end of said inner liner when said further pivotal movement is imparted to the flaps, and
    further wherein
    links, pivotally connected to the downstream portions of said flaps and said casing, constrain movement of said flaps as they are pivoted about their upstream ends.

4. A hot gas stream discharge as in claim 1 which further includes,
    a thrust diverter member having flow-turning vanes and mounted in a fixed position relative to said casing,
    inner and outer covers in overlying relation to and on opposite sides of said member, and
    further wherein,
    the means for discharging at least a portion of said hot gas stream laterally of said casing includes means for removing said covers from overlying relation with said thrust reverser member.

5. A hot gas stream discharge as in claim 4 wherein the upstream ends of said flaps are pivotally mounted on the upstream end of said inner liner, and
    the upstream end of said inner liner is displaced toward the downstream end of said thrust reverter member as said further pivotal motion is imparted to said flaps.

References Cited
UNITED STATES PATENTS
3,032,981 5/1962 Lawler _____ 239—265.13
3,055,174 9/1962 Grotz et al. _____ 239—265.13
3,059,426 10/1962 Laucher et al. _____ 239—265.31

FOREIGN PATENTS
627,686 9/1961 Canada.

EVERETT W. KIRBY, *Primary Examiner.*